US008514262B2

(12) United States Patent　　(10) Patent No.: US 8,514,262 B2
Ueno et al.　　(45) Date of Patent: Aug. 20, 2013

(54) INFORMATION PROCESSING APPARATUS AND NETWORK CONFERENCE SYSTEM

(75) Inventors: Koji Ueno, Shizuoka-ken (JP);
Nobuhiro Shimogori, Kanagawa-ken (JP); Sogo Tsuboi, Kanagawa-ken (JP);
Keisuke Nishimura, Kanagawa-ken (JP); Akira Kumano, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 513 days.

(21) Appl. No.: 12/712,649

(22) Filed: Feb. 25, 2010

(65) Prior Publication Data

US 2010/0220897 A1　Sep. 2, 2010

(30) Foreign Application Priority Data

Feb. 27, 2009　(JP) ................................ P2009-047133

(51) Int. Cl.
*H04N 7/14* (2006.01)
*G06K 9/00* (2006.01)
(52) U.S. Cl.
USPC ............... 348/14.08; 348/14.01; 348/14.09; 348/14.16; 382/100; 382/103; 382/118
(58) Field of Classification Search
None
See application file for complete search history.

(56) References Cited

U.S. PATENT DOCUMENTS 6,806,898 B1 * 10/2004 Toyama et al. ............ 348/14.16
7,532,230 B2 * 5/2009 Culbertson et al. ........ 348/14.08
2002/0054047 A1 * 5/2002 Toyama et al. ............... 345/629
2005/0063582 A1 * 3/2005 Park et al. .................... 382/154
2008/0298571 A1 * 12/2008 Kurtz et al. .................. 379/156

FOREIGN PATENT DOCUMENTS

| JP | 06-090445 | 3/1994 |
| JP | 07-030877 | 1/1995 |
| JP | 8-195945 | 7/1996 |
| JP | 8-237629 | 9/1996 |
| JP | 8-256316 | 10/1996 |
| JP | 11-355804 | 12/1999 |
| JP | 3292248 | 3/2002 |
| JP | 2002-288686 | 10/2002 |
| JP | 2004-326179 | 11/2004 |

OTHER PUBLICATIONS

Office Action issued Oct. 30, 2012, in Japanese Application No. 2009-047133 (w/English language translation).

* cited by examiner

*Primary Examiner* — Jason M. Repko
*Assistant Examiner* — David Perlman
(74) *Attorney, Agent, or Firm* — Oblon, Spivak, McClelland, Maier & Neustadt, L.L.P.

(57) ABSTRACT

An information processing apparatus is connected with at least one external apparatus via a network. An input image of a first user related to the information processing apparatus is accepted while displaying a plurality of target images on a display. The plurality of target images includes an image of a second user related to the external apparatus. A gaze of the first user is detected from the input image. A target image looked by the first user is recognized from the plurality of target images, based on the gaze. A first head model as a head model of the first user, and a first texture to be projected onto the first head model, are generated. A first ID to identify a subject of the target image, the first head model and the first texture, are transmitted to the external apparatus.

15 Claims, 10 Drawing Sheets

| TARGET ID | DISPLAY AREA | SIZE | VIRTUAL CAMERA INFORMATION |
|---|---|---|---|
| USER A | 10,10 | 100,100 | 50,50 |
| USER B | 110,10 | 100,100 | 50,50 |
| MATERIAL A | 10,110 | 100,150 | - |
| : | : | : | : |

INFORMATION PROCESSING APPARATUS AND NETWORK CONFERENCE SYSTEM

CROSS-REFERENCE TO RELATED APPLICATIONS

This application is based upon and claims the benefit of priority from Japanese Patent Application No. 2009-047133, filed on Feb. 27, 2009; the entire contents of which are incorporated herein by reference.

FIELD OF THE INVENTION

The present invention relates to an information processing apparatus and a network conference system for a plurality of users to participate in a conference via a network.

BACKGROUND OF THE INVENTION

Recently, a network conference system is widely used. In the network conference system, a plurality of terminals (each having a display, a speaker, a camera, a microphone) is connected via internetworking, the Internet, or ISDN (Integrated Services Digital Network), and a plurality of users mutually confers using each terminal. This network conference system operates with following basic principle. First, a first user's video and speech are input via a camera and a microphone of a first terminal of the first user. Next, input information is output via a display and a speaker of a second terminal of a second user, i.e., the input information is informed to the second user. By performing this operation mutually, communication between the first user and the second user can be realized. In this case, a system which one virtual conference space is displayed on a display, or a system which a video of each participant is displayed with a tile shape, exists.

On the other hand, in a communication behavior, importance of non-verbal communication using non-verbal information has been recognized. Especially, in a remote communication such as the network conference, it is pointed that much non-verbal information is dropped. By drop of the non-verbal information, for example, a participant cannot well control turn of utterance (turn-taking). As a result, the conversation cannot proceed smoothly, and a quality of the conversation is affected badly.

Accordingly, as to the network conference system of prior art, in order to recover the non-verbal information based on an eye contact, following two trials are performed. As a first trial, a technique to effectively exclude a parallax effect, which is caused by a situation that a center of the camera is different from a position of another participant to be displayed, is proposed (For example, JP-A H08-195945 (Kokai) (Patent reference 1), JP-A H11-355804 (Kokai) (Patent reference 2)). However, in this method, a problem how to represent information (For example, "who is looking at whom") among a plurality of users cannot be solved, and this method is not useful for the conference.

As to a second trial, a target required for an eye contact is clearly determined, and the eye contact is quickly realized. For example, in JP No. 3292248 (Patent reference 3), in case that a plurality of users utilizes the conference system, a technique to represent the eye contact by changing a camera position and a layout of each user, is proposed. Furthermore, in JP-A H08-237629 (Kokai) (Patent reference 4), on condition that the user's head is modeled, in the same way as the virtual camera of the Patent reference 2, a technique to exclude the parallax effect is proposed. Additionally, as to the user looking at another user, a method to rotate a head of the user's model as 90 degree along a direction of another user is proposed. Furthermore, in JP-A H08-256316 (Kokai) (Patent reference 5), a technique to display a video based on a distance between users (displayed) and realize a user's gaze to a material is proposed.

With regard to importance of non-verbal communication in the communication behavior, in a remote communication such as the network conference, much non-verbal information is dropped. Especially, in the non-verbal information dropped, the most important one is gaze information representing that "In he/she looking at me?", "What is he/she looking at?" and so on.

As to above problem, in the method of the Patent reference 3, a complicated optical system is used. Accordingly, this method has a problem that cheap component cannot be realized. Furthermore, the video display is not represented based on a distance among a plurality of users (displayed). As a result, the gaze information is not always accurate, and unnatural.

In the method of the Patent reference 4, the cheap component is possible. However, the video display is not represented based on a distance among a plurality of users (displayed). Furthermore, in the method of the Patent reference 5, a plurality of videos previously acquired is displayed by switching. Accordingly, a large number of videos for reference need be previously recorded, and distributed to each terminal. Additionally, a user's status in actual conversation is not reflected to the video. As a result, the facial expression and a variation of the user's clothes cannot be reappeared, and unnatural video is displayed.

SUMMARY OF THE INVENTION

The present invention is directed to an information processing apparatus and a network conference system for easily realizing a natural communication among a plurality of users participating in a network conference.

According to an aspect of the present invention, there is provided an information processing apparatus connected with at least one external apparatus via a network, comprising: an acceptance unit configured to accept an input image of a first user related to the information processing apparatus; a display control unit configured to output a plurality of target images on a display, the plurality of target images including an image of a second user related to the external apparatus; a gaze detection unit configured to detect a gaze of the first user from the input image; a recognition unit configured to recognize a target image looked by the first user from the plurality of target images, based on the gaze; a model generation unit configured to generate a first head model as a head model of the first user; a texture generation unit configured to generate a first texture to be projected onto the first head model; and a transmission unit configured to transmit a first ID to identify a subject of the target image, the first head model and the first texture, to the external apparatus.

DETAILED DESCRIPTION OF THE EMBODIMENTS

Figure 1:
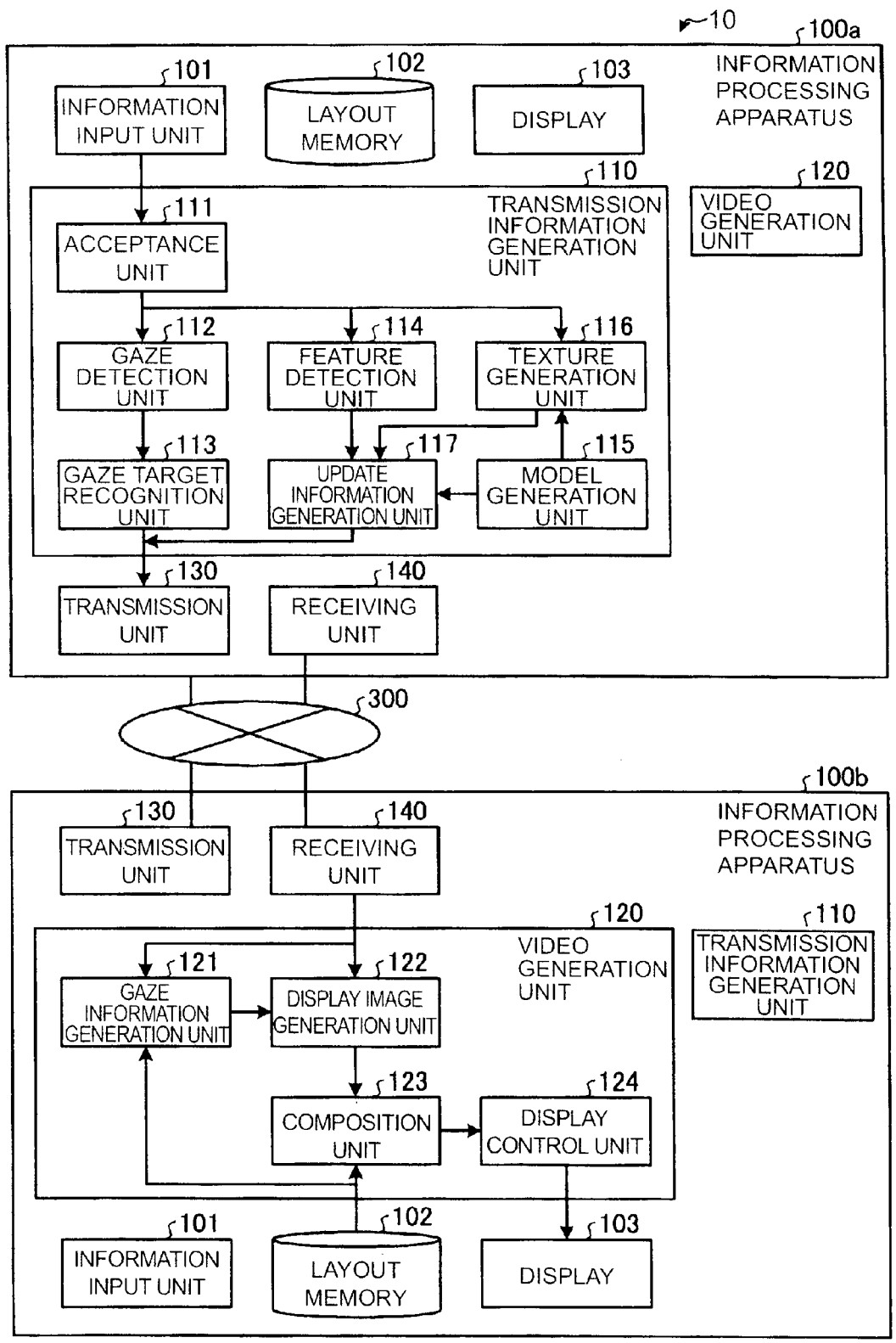
FIG. 1 is a block diagram of a network conference system according to one embodiment.

Hereinafter, embodiments of the present invention will be explained by referring to the drawings. The present invention is not limited to the following embodiments.

In a network conference system of the present embodiment, a gaze target of each user is recognized using a standard video camera and a display apparatus, and a gaze relationship based on layout information on each display is reappeared by three-dimensional CG (Computer Graphics) method using an avatar model.

The avatar model is shown as an image based on a data structure which models each user participating in a network conference system. The avatar model can be displayed as a display image (target image), which represents each user on a display of each terminal (information processing apparatus) composing the network conference system. As explained afterwards, for example, the avatar model is generated by projecting (mapping) a texture (acquired from each user's video) onto a head model of a human (previously determined).

FIG. 1 is a block diagram of the network conference system 10 according to the present embodiment. As shown in FIG. 1, in the network conference system 10, information processing apparatuses 100a and 100b (as a plurality of terminals) are connected via a network 300 such as internetworking (interne), the Internet, or ISDN. In this case, the network 300 is not limited to internet, the Internet, and the ISDN, and can be composed as various network modes usually used.

Information processing apparatuses 100a and 100b are respectively a terminal of each user participating in the network conference system 10. Each terminal has the same component. Hereinafter, a user 1 (not shown in Fig.) utilizes the information processing apparatus 100a, and a user 2 (not shown in Fig.) utilizes the information processing apparatus 100b. The information processing apparatuses 100a and 100b have a symmetrical relationship. Accordingly, both case that data is transmitted from the information processing apparatus 100a to the information processing apparatus 100b, and case that data is transmitted from the information processing apparatus 100a to the information processing apparatus 100b, exist. Hereinafter, in case that data is transmitted from the information processing apparatus 100a to the information processing apparatus 100b, the component is explained. Furthermore, hereinafter, the information processing apparatuses 100a and 100b are simply called an information processing apparatus 100.

As shown in FIG. 1, the information processing apparatus 100 includes an information input unit 101, a layout memory 102, a display 103, a transmission information generation unit 110, a video generation unit 120, a transmission unit 130, and a receiving unit 140.

Moreover, component units except for the information input unit 101, the layout memory 102 and the display 103, may be hardware such as an electronic circuit or a software module having a corresponding function. Furthermore, the component units may be software prepared on an external computer. Hereinafter, in order to simplify, the components are explained to be prepared in the information processing apparatus 100.

The information input unit 101 is a hardware apparatus to input information such as a user's image (video) and a speech. For example, the information input unit 101 can be composed by a camera and a microphone. The information input unit 101 takes an image (video) of the user 1, and outputs as dynamic image information (or continuous still image) encoded by an arbitrary method. As the method for encoding, H.261 or H.263 (well used in a network conference) can be applied, but another method may be applied.

The layout memory stores layout information of display information on the display 103. The layout information includes a position and a size of each area to display other participants (in a conversation), a virtual camera information representing a viewpoint for rendering of an avatar model of each participant, and a position and a size of an area to display a material for common use. The layout information may be composed so that each user indicates the layout information based on the user's liking.

Figures 2, 3:
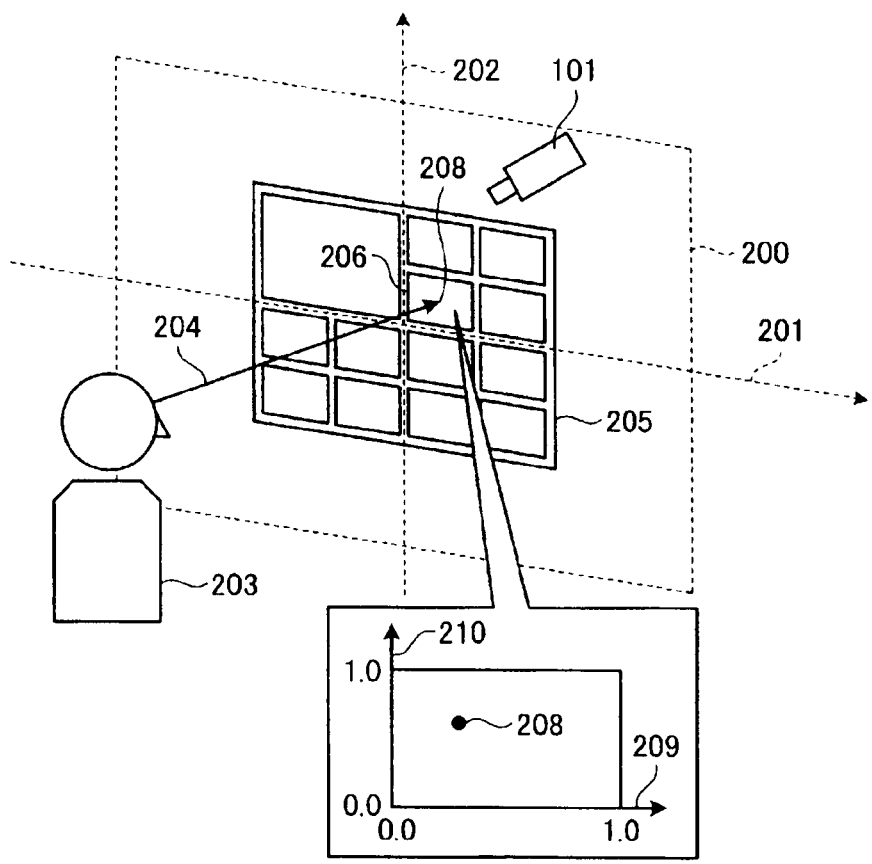
FIG. 2 is one example of data stored in a layout memory in FIG. 1.
FIG. 3 is a schematic diagram to explain generation processing of gaze target information.

FIG. 2 shows one example of structure of data stored in the layout memory 102. As shown in FIG. 2, the layout memory 102 stores the layout information including a target ID as identification information to identify each user (other participants) and the material for common use, a coordinate of a display area, a size of the display area, and the virtual camera information. A mechanism to reflect the layout information on the display 103 is explained afterwards. Moreover, the layout memory 102 can be all memory medium generally used, such as a HDD (i.e., hard disc drive), a memory card, and a RAM (Random Access Memory).

Return to FIG. 1, the display 103 is a display apparatus such as a liquid display to display each kind of information. For example, the display 103 displays a video representing a plurality of participants in the conversation.

The transmission information generation unit 110 generates information to transmit to an external apparatus such as another information processing apparatus 100 participating in the network conference system 10. The transmission information generation unit 110 includes an acceptance unit 111, a gaze detection unit 112, a gaze target recognition unit 113, a feature detection unit 114, a model generation unit 115, a texture generation unit 116, and an update information generation unit 117.

The gaze detection unit 112 detects a gaze of the user 1 by analyzing an input video of the user 1, and outputs gaze information including a direction of the gaze. As this technique, for example, as disclosed in JP No. 3361980, a method for acquiring the user's gaze by analyzing the user's video is well known. As the gaze information, for example, a vector (gaze vector) representing a gaze direction of the user 1 in a world coordinate system can be used. Furthermore, gaze information which a middle point between both eyes is represented as a position coordinate in the world coordinate system may be used. Furthermore, gaze information which a cross point between the gaze and an extended plane of a display plane is represented as a point coordinate in arbitrary two-dimensional coordinate system on the display plane may be output.

The gaze target recognition unit 113 recognizes a subject (display target) gazed by the user 1, from the gaze information (acquired by the gaze detection unit 112) and layout information (stored in the layout memory 102), and outputs gaze target information including a target ID of the subject (hereinafter called gaze target) and a gaze point coordinates.

The gaze point coordinates represent a location of a gaze point in a coordinate system set adjacent to the gaze target.

The feature detection unit 114 detects features from a dynamic image (video) acquired by the information input unit 101, and outputs feature quantity. Each feature represents location and attitude of a facial part, and the feature vector which combines detected features at specified time describes one's facial expression at the time. As this feature point, points of mouth edges, corners of eyes, and eyebrows of right and left are listed. As a technique to detect this feature point, for example, a technique proposed in JP-A No. 2008-3749 (Kokai) is applied.

The model generation unit 115 provides a human's head model necessary for generating a three-dimensional CG model of the user 1. In addition to a general three-dimensional wire frame model, the head model includes information representing each facial part corresponds which part of the wire frame model, and a coordinate of one point representing the head as a start point to calculate the gaze vector. The head model may be created by matching with a general human's head or by using measured data of each user. Furthermore, the head model may be continuously used as a prepared one beforehand or updated during usage of the system according to necessity.

The texture generation unit 116 outputs image data of pixel unit (as a texture) adjusted to create a video similar to the user's video by adding to three-dimensional wire frame model (provided by the model generation unit 115). Concretely, first, the texture generation unit 116 recognizes a face of the user 1 from the video acquired by the information input unit 101. Then, by matching image data of the recognized face with the head model, the texture generation unit 116 generates a texture as image data to map onto the head model, and outputs the texture.

The update information generation unit 117 generates an avatar model update information to update an avatar model of the user 1 (to be displayed by another information processing apparatus 100). Concretely, the update information generation unit 117 generates the avatar model update information including a head model (output from the model generation unit 115), a feature of expression (output from the feature detection unit 114), and a texture (output from the texture generation unit 116).

The transmission unit 130 transmits each kind of information to an external apparatus. For example, the transmission unit 130 transmits the gaze target information (output from the gaze target recognition unit 113) and the avatar model update information (output from the update information generation unit 117) to another information processing apparatus 100 participating in the network conference system 10. Moreover, in case of transmitting the avatar model update information, the transmission unit 130 transmits data at timing based on whether to update the head model and limitation of a communication band. In an example of FIG. 1, information generated by the transmission information generation unit 110 is transmitted to an information processing apparatus 100b by the transmission unit 130 (of the information processing apparatus 100a).

As mentioned-above, the information processing apparatus 100a (as an apparatus to input information) and the information processing apparatus 100b (as an apparatus to output the information) are connected via a network 300. Then, the gaze target information (output from the gaze target recognition unit 113) and the avatar model update information (output from the update information generation unit 117) are transmitted via the network 300.

Detail system of the transmission may be anything. For example, in a network conference connected at multipoint, P2P (Peer to Peer) system may be applied, or a component using MCU (Multipoint Control Unit) may be applied. Furthermore, the network may be TCP/IP system or ISDN network.

Hereinafter, a function executed by the information processing apparatus 100b (for receiving information transmitted from the information processing apparatus 100a) is explained. The receiving unit 140 receives each kind of information from an external apparatus. For example, the receiving unit 140 receives the gaze target information and the avatar model update information from another information processing apparatus 100 participating in the network conference system 10.

The video generation unit 120 generates a display image (avatar model) of the user 1 to be displayed on the display 103, based on the received information.

The gaze information generation unit 121 generates gaze information including a gaze direction of the user 1 (to be displayed on the display 103), from the gaze target information received, the head model included in the avatar model update information received, and the layout information stored in the layout memory 102. For example, the gaze information generation unit 121 generates gaze information as a two-dimensional vector (gaze vector) on a display coordinate system.

The display image generation unit 122 generates an avatar model of the user 1 (representing a suitable gaze) as a display image of the user 1, from the avatar model update information (received) and the gaze information (acquired from the gaze information generation unit 121). The avatar model is information for rendering a person used by a general three-dimensional CG method, and includes wire frame model information and texture image information.

The composition unit 123 composes a group of avatar models (generated by the display image generation unit 122 for each of a plurality of user as other participants) into one video, based on the layout information stored in the layout memory 102. Moreover, in case of composing the video, the composition unit 123 executes three-dimensional CG rendering of avatar model by a general method. In case of composing into a final video, the composition unit 123 may compose a plurality of videos using tile-layout or overlapping two-dimensional windows (used in a general window system). The display control unit 124 controls the display 103 to display the video composed by the composition unit 123.

By above-mentioned function of each unit, in the network conference system in FIG. 1, information that a gaze of the user 1 turns toward which direction is exactly informed to a user 2 by correcting a gaze of the avatar model of the user 1, irrespective of screen layout.

Figure 4:
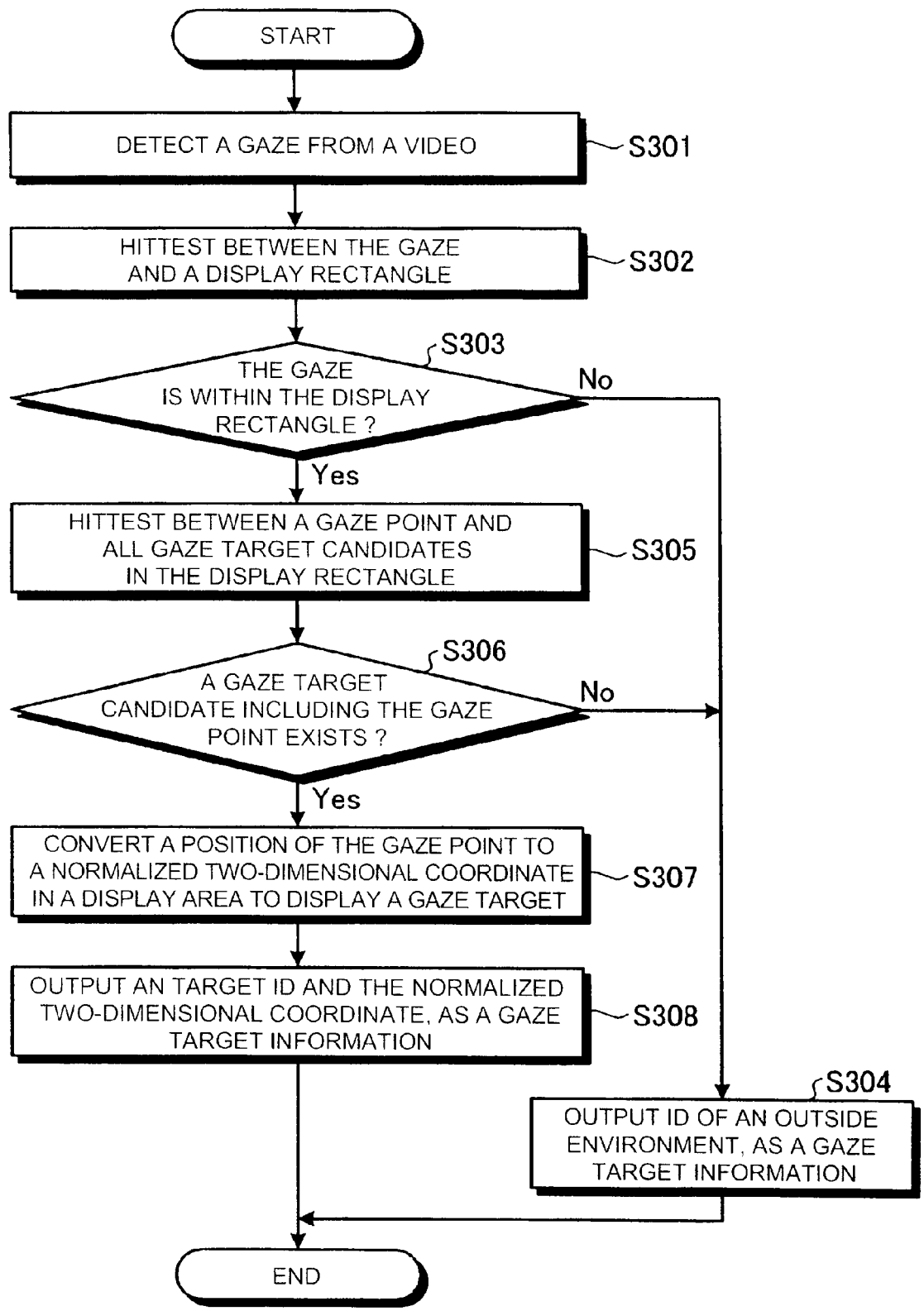
FIG. 4 is a flow chart of the generation processing of gaze target information according to one embodiment.

Next, processing to generate gaze target information by the information processing apparatus 100 of the present embodiment is explained by referring to FIGS. 3 and 4. FIG. 3 is a schematic diagram to explain outline of the processing to generate gaze target information.

In FIG. 3, a rectangle plane 200 in space represents a cross area between a gaze region detectable by the gaze detection unit 112 and a plane infinitely extended from a display rectangle plane 205. Coordinates axes 201 and 202 are one example of coordinate axes forming an orthogonal coordinate system on the plane infinitely extended from the display rectangle plane 205.

The gaze detection unit 112 detects a gaze of a user 203 from a video of the user 203 (taken by the information input unit 101), and outputs a cross point 208 between the gaze 204 and the rectangle plane 200 as the gaze information (not shown in FIG. 3). Concretely, the gaze detection unit 112 outputs a coordinate of the cross point 208 on a coordinate system formed by coordinate axes 201 and 202.

The gaze target recognition unit 113 recognizes a gaze target actually looked by, from gaze target candidates previously known. First, it is decided whether the cross point 208 (output from the gaze detection unit 112) is included in the display rectangle plane 205. In FIG. 3, the cross point 208 is included in the display rectangle plane 205. Accordingly, the gaze target recognition unit 113 further decides that the cross point 208 is included which gaze target using the layout information. Concretely, the gaze target recognition unit 113 executes a hit testing between the cross point 208 and each gaze target candidate displayed as a rectangle window on the display 103, and recognizes a gaze target candidate including the cross point 208.

In FIG. 3, the cross point 208 is included in a rectangle window 206. Accordingly, the gaze target recognition unit 113 outputs a target ID of a target displayed on the rectangle window 206, and a coordinate of the cross point 208 converted to a normalized coordinate system formed by orthogonal axes 209 and 210 in the rectangle window 206, as gaze target information.

The target ID may be any kind of codes if it is commonly unified in the network conference system 10. The gaze target candidate is, for example, a video of another user participating in the conference, a shared material such as a document, and a chat window. Furthermore, if the gaze detection unit 112 can output three-dimensional information, papers on a desk, an article made on an experimental base, or a white board differently prepared, may be used as the gaze target candidate.

Next, a flow of processing to generate gaze target information is explained by referring to FIG. 4. FIG. 4 is a flow chart of entire processing to generate gaze target information according to the present embodiment.

First, the gaze detection unit 112 detects a user's gaze from a video input by the acceptance unit 111, and outputs gaze information representing the gaze (S301). As mentioned above, the gaze information may be a pair of a three-dimensional point and a gaze vector, or a two-dimensional coordinate on a known plane.

Next, by using the gaze information, the gaze target recognition unit 113 executes a hit testing between the user's gaze and a display rectangle plane (S302). The hit testing corresponds to decision whether the gaze vector crosses the plane. Then, the gaze target recognition unit 113 decides whether the user's gaze turns toward the display 103 or an outside environment representing another part (S303).

If the user's gaze turns toward the outside environment except for the display 103 (No at S303), the gaze target recognition unit 113 outputs a target ID representing the outside environment and a normalized two-dimensional coordinate, as the gaze target information (S304). The two-dimensional coordinate represents the user's gaze direction from the user's eyeball position. For example, it is a value which a radius direction element (a quantity related to a length) is excluded from a three-dimensional polar-coordinate based on the origin (the user's eyeball position).

If the user's gaze turns toward the display 103 (Yes at S303), as to all gaze target candidates on the display 103, the gaze target recognition unit 113 executes the hit testing between the user's gaze and each area of gaze target candidates on the display 103 (S305).

The gaze target candidate is an object which can be recognized by this system, as a gaze target of the user, among a plurality of displayed objects on the display 103. Furthermore, this hit testing means that check if the gaze point (a cross point between the gaze vector and the plane) is included within a displayed area of each gaze target candidate on the display plane.

Then, the gaze target recognition unit 113 decides whether a hit candidate exists, i.e., a gaze target candidate including the gaze point exists (S306). If the hit gaze target candidate does not exist (No at S306), it is decided that the user's gaze turns toward the outside environment, and the target ID of the outside environment and the two-dimensional coordinate are output as gaze target information (S304).

If the hit gaze target candidate (Hereinafter, it is called a gaze target) exists (Yes at S306), first, the gaze target recognition unit 113 converts a position of the gaze point to a two-dimensional coordinate normalized for a display area of the gaze target on the display 103 (S307). For example, if the gaze target is a video of another user and displayed on a rectangle window, the rectangle window is regarded as two-dimensional coordinate system of X-Y, and coordinates of the position of the gaze point in the rectangle window is normalized as a value "within 0.0 to 1.0". Briefly, all coordinates in the window are represented as (0.0)~(1.1).

Last, the gaze target recognition unit 113 outputs the object ID of the gaze target and two-dimensional coordinate (normalized two-dimensional coordinate) guided at S306, as the gaze target information (S308). By above processing, the gaze target recognition unit 113 recognizes a gaze target as an object looked by the user, and outputs by coding the gaze target.

Figure 5:
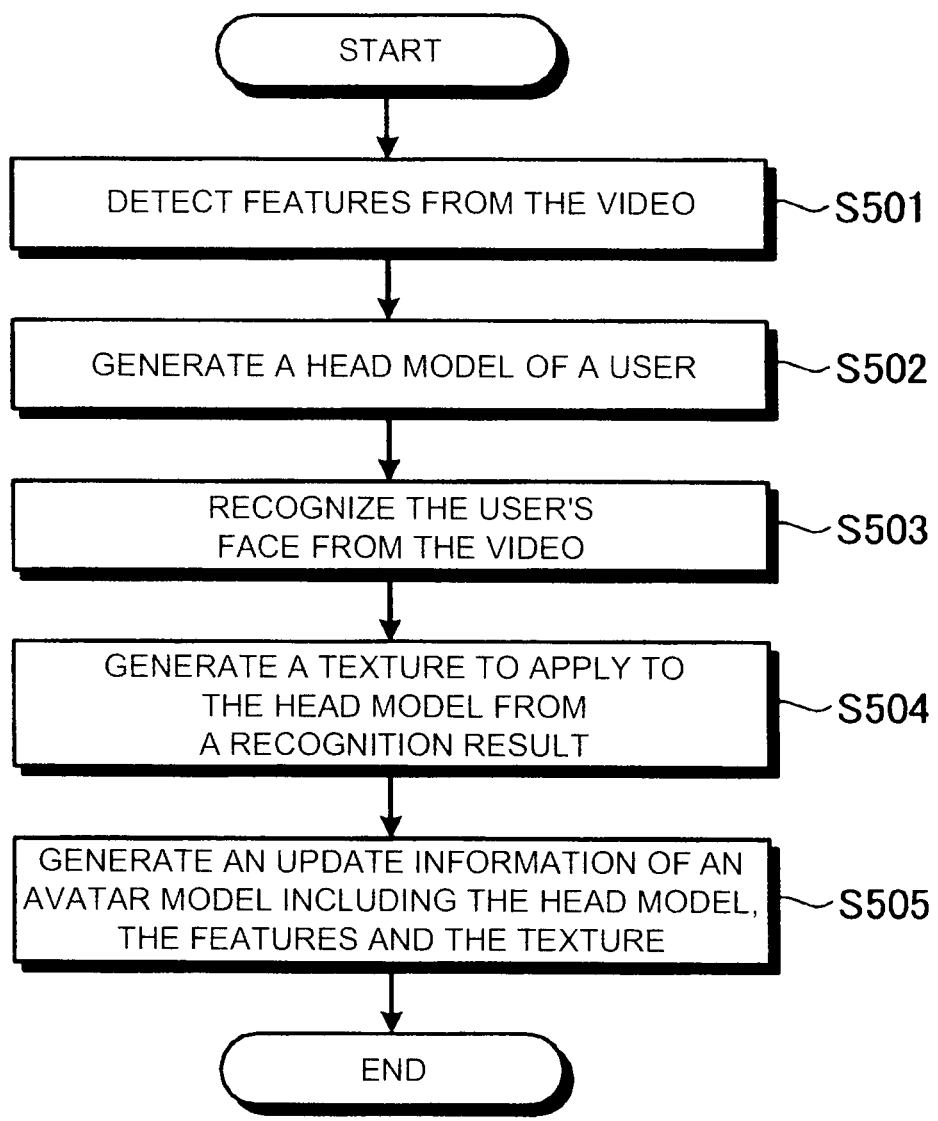
FIG. 5 is a flow chart of generation processing of update information according to one embodiment.

Next, a flow of processing to generate update information of an avatar model is explained by referring to FIG. 5. FIG. 5 is a flow chart of entire processing to generate update information according to the present embodiment.

First, the feature detection unit 114 detects features of a user's expression from the user's video (S501). Next, the model generation unit 115 generates a head model of the user (S502). Next, the texture generation unit 116 recognizes the user's face from the user's video (S503). Next, the texture generation unit 116 generates a texture to apply to the head model from the recognition result of the user's face (S504).

Then, the update information generation unit 117 generates avatar model update information including the head model (generated by the model generation unit 115), the features (detected by the feature detection unit 114), and the texture (generated by the texture generation unit 116) (S505), and the processing to generate update information is completed.

Figure 6:
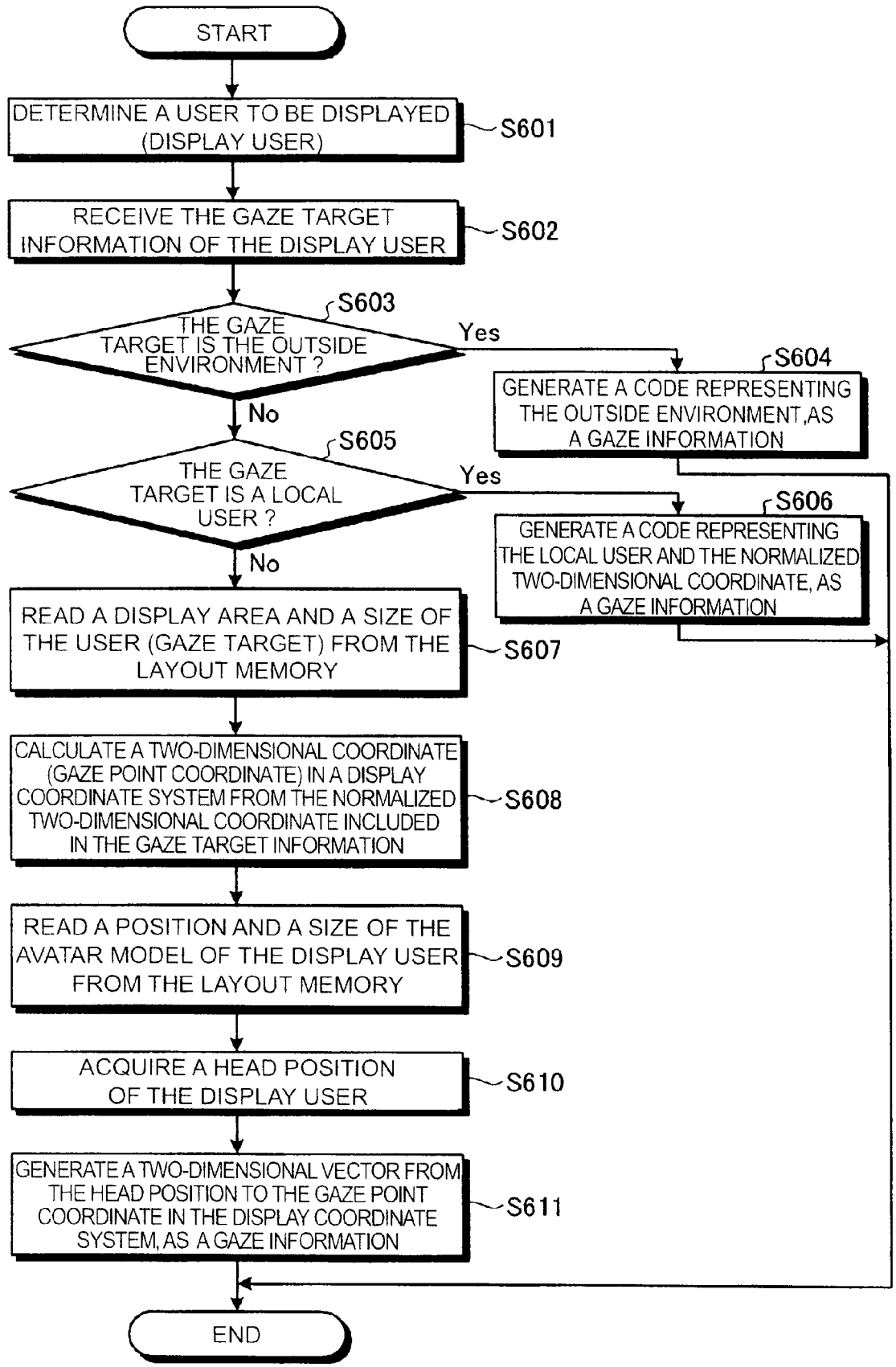
FIG. 6 is a flow chart of generation processing of gaze information according to one embodiment.
Figure 7:
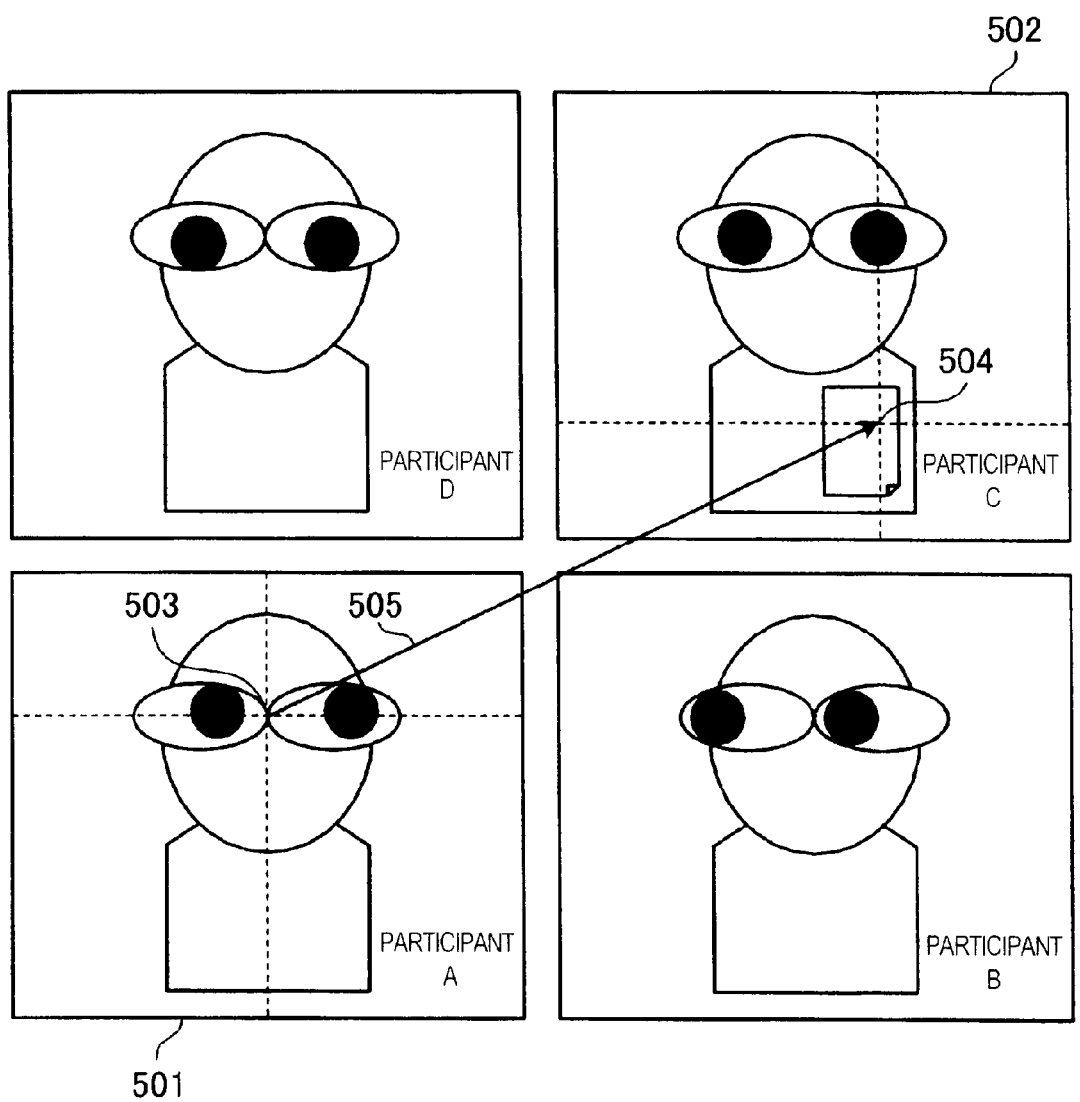
FIG. 7 is one example of a screen to explain the generation processing of gaze information.

Next, a flow of processing to generate gaze information by the gaze information generation unit 121 is explained by referring to FIGS. 6 and 7. FIG. 6 is a flow chart of entire processing to generate gaze information according to the present embodiment. FIG. 7 is one example of a screen to explain generation of update information.

in this case, FIG. 7 shows a screen example of the display 103 of the information processing apparatus 100b of a user as a fifth participant (participant E) in the conference. In FIG. 7, videos of participants A~D (four users) in the network conference are rendered as a tile-shape. Hereinafter, an execution example of the gaze information generation unit 121 of the information processing apparatus 100*b* used by the participant E is explained.

First, the gaze information generation unit 121 determines a user (Hereinafter, it is called a display user) of which video is rendered on the display 103 (S601). In FIG. 7, assume that a participant A rendered on a rectangle area 501 is determined as the display user.

The gaze information generation unit 121 receives gaze target information of the display user from the gaze target recognition unit 113 of the information processing apparatus 100*a* used by the display user (S602). As mentioned-above, the gaze target information includes an object ID of the gaze target (including the outside environment) and the two-dimensional coordinate normalized. Next, the gaze information generation unit 121 decides whether the gaze target is the outside environment based on the object ID (S603).

If the gaze target is the outside environment (Yes at S603), the gaze information generation unit 121 outputs a code representing the outside environment as the gaze information (S604). On the other hand, if the gaze target is not the outside environment (No at S603), the gaze information generation unit 121 decides whether the gaze target is the participant E as a local user of the information processing apparatus 100*b* (S605).

If the gaze target is the participant E (Yes at S605), the gaze information generation unit 121 outputs a code representing the local user and the normalized two-dimensional coordinate included in the gaze target information (received at S602) as the gaze information (S606).

If the gaze target is not the participant E (No at S605), the gaze information generation unit 121 acquires position information of the gaze target (a position of the gaze target) on the display 103 from the layout memory 102 of the information processing apparatus 100*b* (S607). For example, if the gaze target is a video of another participant on the display 103, the gaze information generation unit 121 acquires position information of an area to render the video. In FIG. 7, assume that a participant C is the gaze target. In this case, the gaze information generation unit 121 acquires position information of a rectangle area 502.

Next, the gaze information generation unit 121 calculates a coordinate of a gaze point representing a two-dimensional coordinate in a display coordinate system from the normalized two-dimensional coordinate in the rectangle area of the gaze target (S608). In FIG. 7, a point 504 in the video of the participant C is indicated as the normalized coordinate in the rectangle area 502. Accordingly, the gaze information generation unit 121 calculates a two-dimensional coordinate (a coordinate of a gaze point) of the point 504 in the display coordinate system, from a display position and a size of the rectangle area 502 on the display 103. For example, assume that the normalized coordinate is (0.7, 0.3), a left lower point of the rectangle area 502 on the display 103 is (400, 400), a width of the rectangle area 502 is 300, and a height of the rectangle area 502 is 250. In this case, a coordinate of the point 504 in the display system is (610, 475).

Furthermore, the gaze information generation unit 121 acquires a position (user position) and a size to display the participant A (display user) on the display 103 (S609). The gaze information generation unit 121 acquires the position and the size from the layout memory 102 of the information processing apparatus 100*b*.

Furthermore, the gaze information generation unit 121 acquires a head position of avatar model of the display user (S610). The head position is information to determine a position to display the avatar model (generated from the avatar model). For example, a position of a mid-point between both eyes can be used as the head position.

In order to acquire the head position, the gaze information generation unit 121 acquires a three-dimensional coordinate representing the mid-point between both eyes of the head model, from the head model included in the avatar model update information received by the information processing apparatus 100 used by the display user (participant A). Then, the gaze information generation unit 121 converts the three-dimensional coordinate to a two-dimensional coordinate projected onto the display coordinate system by using virtual camera information for rendering avatar model stored in the layout memory 102. In this way, the head position is acquired.

In the example of FIG. 7, the gaze information generation unit 121 acquires a position and a size of the rectangle area 501 to display the participant A from the layout memory 102, and acquires a coordinate of the point 503 in the video as the head position.

Last, the gaze information generation unit 121 calculates a gaze vector 505 as two-dimensional vector from the point 503 (converted into the display coordinate system by the same method as S608) to the point 504 (gaze point) in the display coordinate system, and outputs the gaze vector 505 as the gaze information (S611).

Figure 8:
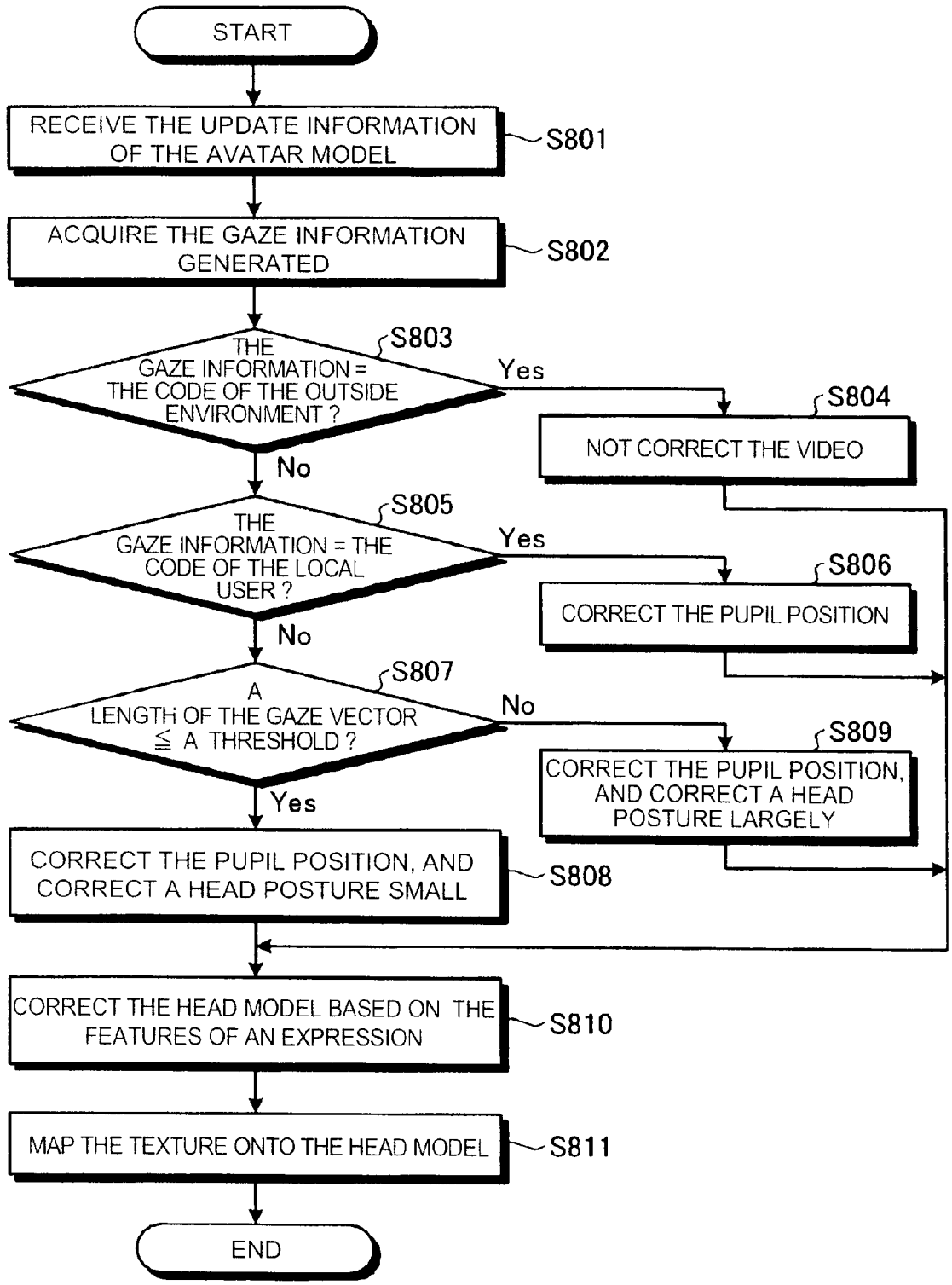
FIG. 8 is a flow chart of update processing of an avatar model according to one embodiment.
Figure 9:
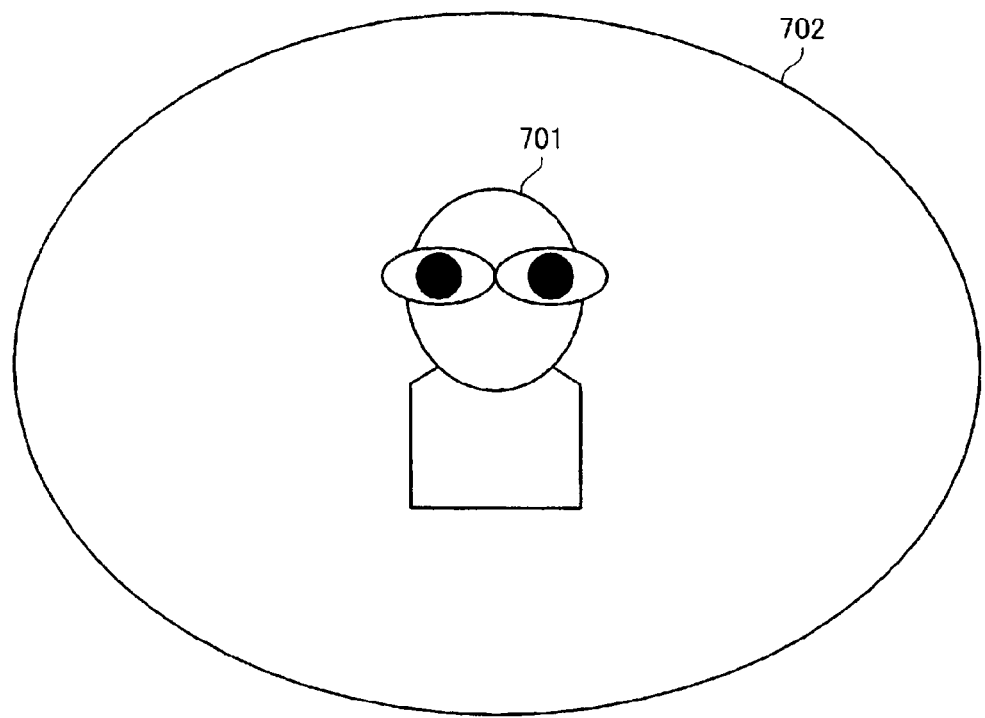
FIG. 9 is one example of a prescribed range to decide a correction quantity of a gaze for a display user.
Figure 10:
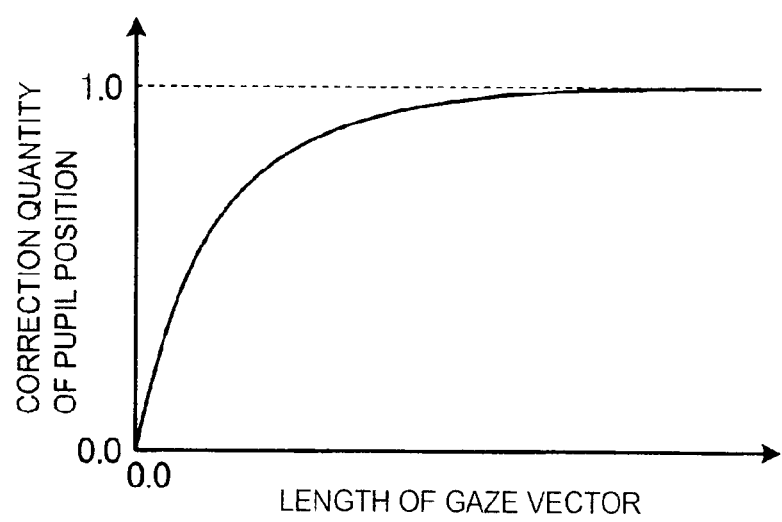
FIG. 10 is one example of a graph to determine the correction quantity used for correcting a pupil.

Next, one example of processing to update an avatar model of a display user by the display image generation unit 122 is explained by referring to FIGS. 8, 9 and 10. FIG. 8 is a flow chart of entire processing to update the avatar model according to the present embodiment. FIG. 9 is a schematic diagram to explain a prescribed range (threshold) to decide a correction quantity of the gaze for the display user (avatar model). FIG. 10 is one example of a curved line to calculate the correction quantity used for correcting the pupil of the avatar model.

As shown in FIG. 8, the display image generation unit 122 receives avatar model update information from the update information generation unit 117 of the information processing apparatus 100*a* used by the display user (S801). Furthermore, the display image generation unit 122 acquires gaze information generated from the gaze information generation unit 121 (S802).

Next, the display image generation unit 122 decides whether a code (gaze target) representing the outside environment is input as gaze information (S803). If the code representing the outside environment is acquired as the gaze information (Yes at S803), the display image generation unit 122 completes the avatar model update processing without correcting the avatar model (S804).

If the code representing the outside environment is not acquired as the gaze information (No at S803), the display image generation unit 122 decides whether a code (gaze target) representing a local user (participant E) of the information processing apparatus 100*b* is acquired as the gaze information (S805).

If the code representing the local user is acquired (Yes at S805), the display image generation unit 122 corrects only a positions of a pupil in an eye model included in the avatar model of the display user (S806). Moreover, the display image generation unit 122 inputs a length of the gaze vector corresponding to a distance between a display image of the display user and a display image of the gaze target, and calculates a correction quantity of the position of the pupil of the display user by using a predetermined function to output the correction quantity of the position of the pupil. Then, by moving the pupil as the correction quantity from an initial position (For example, a center of the eye) of the pupil along a direction of the gaze vector, the display image generation unit 122 corrects the position of the pupils.

FIG. 10 is one example of a function to calculate the correction quantity. In the example of FIG. 10, the correction quantity of the pupil monotonously increases in proportion to a length of the gaze vector. When the length of the gaze vector is 0.0, the correction quantity of the pupil is 0.0. Briefly, the position of the pupil is not corrected, and the gaze of the avatar model turns toward a camera-frontal direction. In proportion to the length of the gaze vector, the correction quantity of the pupil is larger, and the maximum is 1.0. In this case, the pupil is positioned at the corner of the eye.

On the other hand, if the gaze target is neither the outside environment nor the local user, the gaze target exists on the display 103. Briefly, if the code representing the local user is not acquired (No at S805), first, the display image generation unit 122 decides whether a length of the gaze vector included in the gaze information (acquired at S802) is not larger than a prescribed threshold (S807). In FIG. 9, the prescribed range 702 represents a region in which a length of the gaze vector of a user 701 is not larger than the threshold. The display image generation unit 122 decides whether the gaze vector is included in the prescribed range 702.

If the length of the gaze vector is not larger than the threshold (Yes at S807), the display image generation unit 122 small corrects a posture of the head, in addition to correction of the position of the pupil (S808). Moreover, small correction of the posture of the head represents, for example, the head model is rotated toward a direction of the gaze target, to a degree that the back of the head is not displayed.

By small correction of the posture of the head, without unnatural moving of the pupil, the back of the head not included in a video (taken from the user) need not be displayed. As this technique, for example, the Motion Portrait Technique by Motion technique, Inc. is well known.

If the length of the gaze vector is larger than the threshold (No at S807), the display image generation unit 122 largely corrects the posture of the head, in addition to correction of the position of the pupil (S809). Moreover, the large correction of the posture of the head represents, for example, irrespective of appearance of the back of the head, the head model is rotated toward a direction of the gaze target as the length of the gaze vector.

In this case, as to a three-dimensional head model previously created, following method can be used. Briefly, as to a part to which a video of the display user can be reflected, the video is used as a texture. As to a part to which the video cannot be reflected, a texture previously prepared is used.

Next, by applying features of an expression included in the avatar model update information (received) to the avatar model of the display user, the display image generation unit 122 corrects the avatar model to have the expression corresponding to the features (S810). Moreover, the applied features are different based on the head model to be used. Accordingly, the feature detection unit 114 detects features corresponding to the head model generated by the model generation unit 115. Next, by mapping a texture included in the avatar model update information (received) onto the avatar model, the display image generation unit 122 corrects the avatar model (S811).

By above-mentioned steps, the user video is corrected based on the gaze information given, and the user's gaze information can be exactly represented as the video. Furthermore, as shown in steps S810 and S811, the avatar model to which the user's expression and video in actual conversation are reflected can be generated. Accordingly, natural communication can be realized without the user's consciousness.

Figure 11:
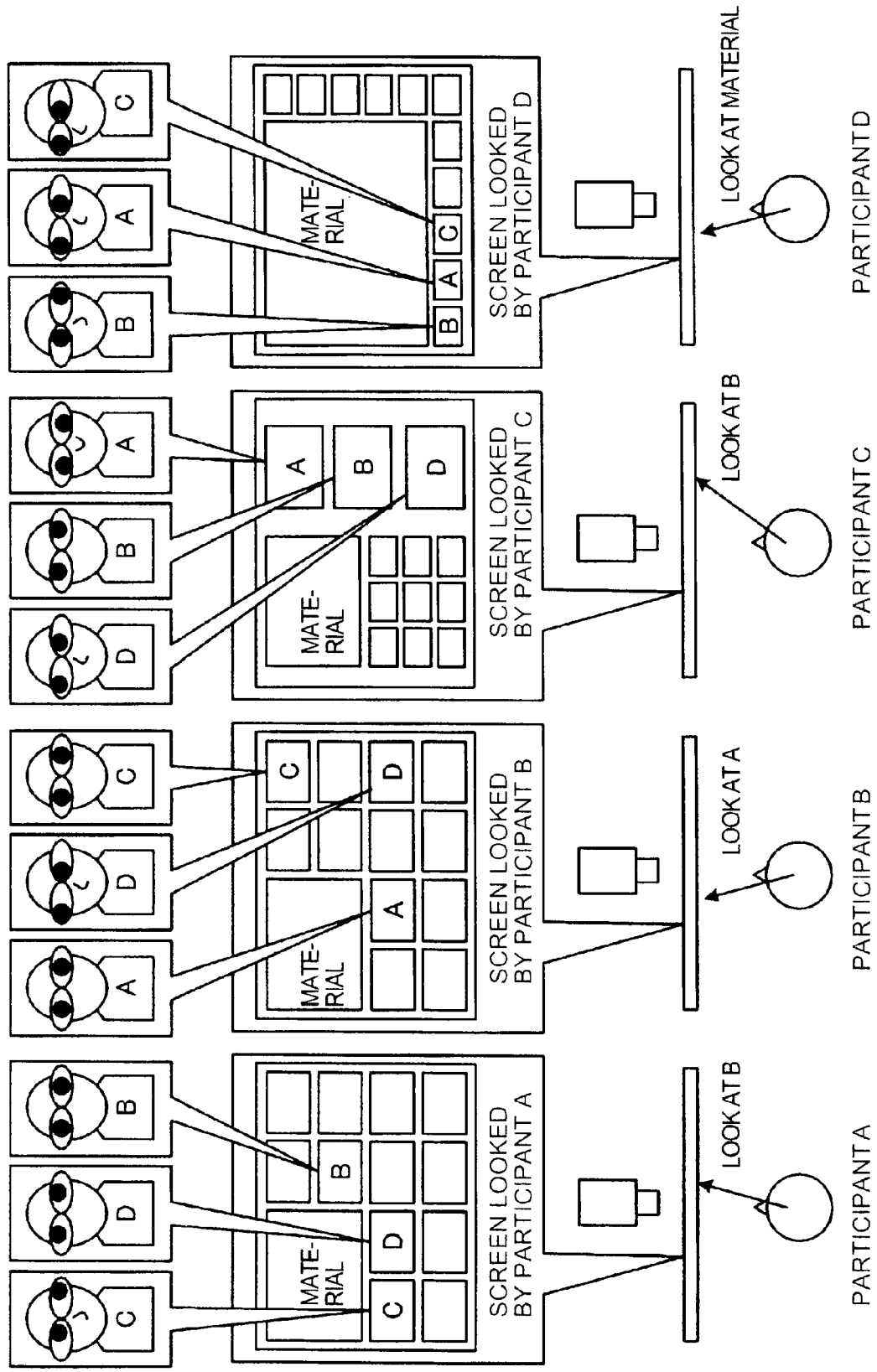
FIG. 11 is one example of a screen displayed on the network conference system in FIG. 1.

Next, a concrete example of a screen displayed in the network conference system 10 according to the present embodiment is explained by referring to FIG. 11. In FIG. 11, an example that participants A-D participates in the network conference is shown. Each participant utilizes one information processing apparatus 100, and a layout on the display 103 is different based on each person's liking.

As shown in the lower part of FIG. 11, a participant A looks as a participant B, the participant B looks as the participant A, a participant C looks as the participant B, and a participant D looks at a material commonly used. By the method of the present embodiment, as shown in FIG. 11, these gaze relationships can be reappeared on each display 103 of the information processing apparatus 100 used by each participant.

as to the traditional technique, in this situation, gaze information such as "who looks at whom" cannot be exactly informed to all participants. By using the virtual camera technique, a video based on an angle between a gaze of a participant (viewer) and a gaze of another participant in the video can be presented. However, a camera position is changed whenever the gaze of another participant is moving, and this is very unnatural.

On the other hand, as to the method of the present embodiment, a gaze target of the participant is recognized at an information input apparatus side, and gaze information based on a layout of the display 103 is regenerated at an information output apparatus side. Accordingly, as shown in FIG. 11, all images of other participants at all terminals can be exactly presented with natural gaze information, and non-verbal communication can be smoothly performed.

Moreover, in case of the network conference system in which a video of a user utilizing the information processing apparatus 100 is displayed, the video of the user may not be corrected.

Furthermore, by using the virtual camera function disclosed in the Patent reference 2, the information input unit 101 may virtually convert the video of the user to a video taken from a center line of the display.

Furthermore, the texture generation unit 116 may output a texture video previously prepared, instead of a texture generated from an actual video of the user. In this case, the composition unit 123 may output a mark or a character sequence representing "non-live video" with the video via the display 103. Furthermore, conversely, in case of using the actual video of the user, the composition unit 123 may output a mark or a character sequence representing "live video" with the video via the display 103. More concretely, a type of texture representing that the texture is generated from the video of the user or a fixed texture prepared is transmitted by the transmission unit 130 and received by the receiving unit 140. Based on the type of texture, a mark representing "live video" or "non-live video" may be displayed.

Furthermore, the layout of screen is not a tile-shape but a display in which a plurality of participants is overlaid in one window, or a video of virtual conference room. In this case, as a gaze target, a participant nearest to the gaze point is selected.

In this way, in the network conference system of the present embodiment, a gaze target of each user is recognized using a standard video camera and a display apparatus. By three-dimensional CG method using the avatar model, a gaze relationship is reappeared based on a layout on each display. Accordingly, in both a virtual conference space system and a tile display system, natural communication using the gaze information can be easily performed.

Furthermore, unlike the Patent reference 5, the video need not previously prepared. The avatar model to which a user's video during actual conversation is reflected is displayed.

Accordingly, natural communication can be easily realized without the user's consciousness. Furthermore, in this case, not the user's video itself, a head model which the user is modeled and an image (texture) to map onto the head model are only transmitted. As a result, overhead of data transmission quantity can be avoided.

Figure 12:
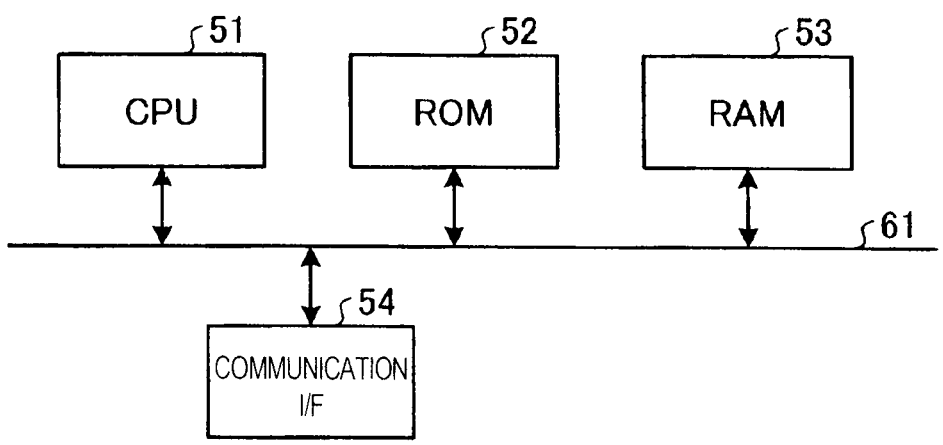
FIG. 12 is a hard component of an information processing apparatus according to one embodiment.

Next, a hardware component of the information processing apparatus according to the present embodiment is explained by referring to FIG. 12. FIG. 12 is a block diagram of the hardware component of the information processing apparatus.

In the present embodiment, the information processing apparatus includes a control apparatus such as a CPU (central Processing Unit) 51, a memory apparatus such as a ROM (Read Only Memory) 52 or a RAM 53, a communication I/F 54 to communicate by connecting with a network, an external memory apparatus such as a CD (Compact Disc) or a drive apparatus, a display apparatus such as a display, an input apparatus such as a keyboard or a mouse, and a bus 61 to connect each unit. Briefly, the information processing apparatus has a hardware component using a regular computer.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An information processing apparatus connected with at least two external apparatuses via a network, the information processing apparatus being implemented by a computer to execute computer-readable instructions, comprising:

an acceptance unit using the computer, configured to accept an input image of a first user related to the information processing apparatus;

a memory configured to store a position of each of a plurality of target images on a display, a display control unit configured to output each of the plurality of target images on any of a plurality of rectangle area of the display, the plurality of target images including an image of a second user related to one of the at least two external apparatuses and an image of a third user to another of the at least two external apparatuses;

a gaze detection unit using the computer, configured to detect a gaze of the first user from the input image;

a recognition unit using the computer, configured to recognize a target image looked by the first user from the plurality of target images on the display, based on the gaze;

a model generation unit using the computer, configured to generate a first head model as a head model of the first user;

a texture generation unit using the computer, configured to generate a first texture to be projected onto the first head model;

a transmission unit using the computer, configured to transmit a first ID to identify a subject of the target image, the first head model and the first texture, to the at least two external apparatuses;

a receiving unit using the computer, configured to receive a second ID to identify a subject of a target image looked by the second user on a display of the one external apparatus, a second head model as a head model of the second user, and a second texture to be projected onto the second head model, from the one external apparatus;

a gaze information generation unit using the computer, configured to read a first position as a position of a target image of the second user and a second position as a position of the target image of the subject identified by the second ID, from the memory, and to generate gaze information representing a direction from the first position to the second position; and an image generation unit using the computer, configured to generate the target image of the second user by projecting the second texture onto the second head model, by setting the direction to a gaze direction of the second head model as twodimensional vector on the plurality of rectangle area of the display, and by correcting a posture of the second head model, wherein the image generation unit compares a distance between the first position and the second position to a threshold, and sets a smaller value to a correction quantity of the posture in case of the distance not larger than the threshold, in comparison with a correction quantity of the posture in case of the distance larger than the threshold, wherein the display control unit updates the image of the second user by the generated target image on the display, and wherein the gaze direction of the generated target image turns toward the target image identified by the second ID on the display.

2. The apparatus according to claim 1, wherein the receiving unit receives features representing a facial expression of the second user, and the image generation unit projects the second texture onto the second head model having the facial expression represented by the features, and sets the direction to a gaze direction of the second head model.

3. The apparatus according to claim 1, wherein
the second head model has an eye model including a pupil, and
the image generation unit sets the direction to the gaze direction of the second head model by correcting a position of the pupil in the eye model.

4. The apparatus according to claim 1, wherein
the receiving unit receives a texture type representing that the second texture is generated from an image of the second user or a prefixed texture,
the display control unit outputs an information based on the texture type in correspondence with the target image of the second user, the information representing that the second texture is generated from the image of the second user or that the second texture is the prefixed texture.

5. The apparatus according to claim 1, wherein
the receiving unit receives a third ID representing that the second user gazes an outside of the display of the one external apparatus, and
the image generation unit, when the third ID is received, generates the target image of the second user by projecting the second texture onto the second head model without correcting the gaze direction.

6. The apparatus according to claim 1, wherein
the image generation unit, when the first ID identifies the second user and the second ID identifies the first user, generates the target image of the second user by projecting the second texture onto the second head model without correcting the gaze direction.

7. The apparatus according to claim 1, further comprising:
a feature detection unit using the computer, configured to detect features representing a facial expression of the first user from the input image of the first user,
wherein the transmission unit further transmits the features to the at least two external apparatuses.

8. The apparatus according to claim 1, wherein
the texture generation unit generates the first texture from the input image of the first user.

9. The apparatus according to claim 1, wherein
the memory further stores a prefixed texture projectable onto the first head model, and
the texture generation unit generates the first texture by reading the prefixed texture from the memory.

10. The apparatus according to claim 1, wherein
the recognition unit detects a coordinate of a gaze point of the first user in a predetermined coordinate system of a display area of the recognized target image on the display, based on the gaze, and
the transmission unit further transmits the coordinate to the at least two external apparatuses.

11. The apparatus according to claim 1, wherein
the recognition unit detects a coordinate of a gaze point in a predetermined coordinate system of each rectangle area, based on the gaze.

12. The apparatus according to claim 1, wherein
the recognition unit recognizes the target image looked by the first user, as a target image nearest to the gaze point among the plurality of target images on the display.

13. The apparatus according to claim 1, wherein
the recognition unit recognizes that the first user looks at an outside of the display, based on the gaze, and
the transmission unit, when it is recognized that the first user looks at the outside, transmits a third ID representing that the first user looks at the outside, to the at least two external apparatuses.

14. A computer program stored in a non-transitory computer readable medium for causing a computer to perform a method for processing information, the computer being connected with at least two external apparatuses via a network, the method comprising:
accepting an input image of a first user related to the computer;
storing in a memory, a position of each of a plurality of target images on a display;
outputting each of the plurality of target images on any of a plurality of rectangle areas of the display, the plurality of target images including an image of a second user related to one of the at least two external apparatuses and an image of a third user related to another of the at least two external apparatuses;
detecting a gaze of the first user from the input image;
recognizing a target image looked by the first user from the plurality of target images, based on the gaze;
generating a first head model as a head model of the first user;
generating a first texture to be projected onto the first head model;
transmitting a first ID to identify a subject of the target image, the first head model and the first texture, to the at least two external apparatuses;
receiving a second ID to identify a subject of a target image looked by the second user on a display of the one external apparatus, a second head model as a head model of the second user, and a second texture to be projected onto the second head model, from the one external apparatus;
reading a first position as a position of a target image of the second user and a second position as a position of the target image of the subject identified by the second ID, from the memory;
generating gaze information representing a direction from the first position to the second position; and
generating the target image of the second user by projecting the second texture onto the second head model, by setting the direction to a gaze direction of the second head model as two-dimensional vector on the plurality of rectangle areas of the display, and by correcting a posture of the second head model; and
updating the image of the second user by the generated target image on the display,
wherein the generating the target image includes
comparing a distance between the first position and the second position to a threshold, and
setting a smaller value to a correction quantity of the posture in case of the distance not larger than the threshold, in comparison with a correction quantity of the posture in case of the distance larger than the threshold,
wherein the gaze direction of the generated target image turns toward the target image identified by the second ID on the display.

15. A network conference system including a first apparatus related to a first user, a second apparatus related to a second user and a third apparatus related to a third user, the first apparatus, the second apparatus and the third apparatus being connected via a network,
the first apparatus implemented by a first computer to execute computer-readable instructions, comprising:
a first display;
an acceptance unit using the computer, configured to accept an input image of the first user;
a first display control unit configured to output each of a plurality of target images on any of a plurality of rectangle areas of the first display, the plurality of target images including an image of the second user and an image of the third user;

a gaze detection unit using the first computer, configured to detect a gaze of the first user from the input image;

a recognition unit using the first computer, configured to recognize a target image looked by the first user from the plurality of target images, based on the gaze;

a model generation unit using the first computer, configured to generate a first head model as a head model of the first user;

a texture generation unit using the first computer, configured to generate a first texture to be projected onto the first head model; and a transmission unit using the first computer, configured to transmit a first ID to identify a subject of the target image, the first head model and the first texture, to the second apparatus and the third apparatus;

the second apparatus implemented by a second computer to execute computer-readable instructions, comprising:

a second display;

a memory configured to store a position of each of the plurality of target images including an image of the first user and an image of the third user on the second display;

a receiving unit using the second computer, configured to receive the first ID, the first head model and the first texture, from the first apparatus;

a gaze information generation unit using the second computer, configured to read a first position as a position of a target image of the first user and a second position as a position of the target image of the subject identified by the first ID, from the memory, and to generate a gaze information representing a direction from the first position to the second position;

an image generation unit using the second computer, configured to generate the target image of the first user by projecting the first texture onto the first head model, by setting the direction to a gaze direction of the first head model as two-dimensional vector on a plurality of rectangle areas of the second display, and by correcting a posture of the second head model; and a second display control unit configured to output each of the plurality of target images on any of a plurality of rectangle areas of the second display, and to update the image of the first user by the generated target image on the second display, wherein the image generation unit compares a distance between the first position and the second position to a threshold, and sets a smaller value to a correction quantity of the posture in case of the distance not larger than the threshold, in comparison with a correction quantity of the posture in case of the distance larger than the threshold, wherein the gaze direction of the generated target image turns toward the target image identified by the first ID on the display.

* * * * *